US012716029B2

(12) United States Patent
Schucker et al.

(10) Patent No.: US 12,716,029 B2
(45) Date of Patent: Aug. 25, 2026

(54) PROCESS FOR CONVERSION OF WASTE PLASTICS INTO CHEMICALS

(71) Applicant: SABIC GLOBAL TECHNOLOGIES B.V., Bergen op Zoom (NL)

(72) Inventors: Robert C. Schucker, Spring, TX (US); Dustin Farmer, Houston, TX (US); Jason Loiland, Sugar Land, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 257 days.

(21) Appl. No.: 18/720,458

(22) PCT Filed: Dec. 12, 2022

(86) PCT No.: PCT/EP2022/085299
§ 371 (c)(1),
(2) Date: Jun. 14, 2024

(87) PCT Pub. No.: WO2023/117515
PCT Pub. Date: Jun. 29, 2023

(65) Prior Publication Data

US 2026/0167869 A1 Jun. 18, 2026

(30) Foreign Application Priority Data

Dec. 21, 2021 (EP) .................................... 21216456

(51) Int. Cl.
*C10B 55/00* (2006.01)
*B01J 8/20* (2006.01)

(52) U.S. Cl.
CPC ................ *C10B 55/00* (2013.01); *B01J 8/20* (2013.01); *C10G 2300/1003* (2013.01); *C10G 2300/4012* (2013.01)

(58) Field of Classification Search
CPC .... C10B 55/00; B01J 8/20; C10G 2300/1003; C10G 2300/4012
See application file for complete search history.

(56) References Cited

U.S. PATENT DOCUMENTS

2019/0270939 A1 9/2019 Javeed et al.
2021/0087473 A1* 3/2021 Pradeep .................. C10G 1/10
2023/0357644 A1* 11/2023 Li ........................... C10G 1/10

FOREIGN PATENT DOCUMENTS

GB 2024245 A 1/1980
WO 9514069 A1 5/1995
(Continued)

OTHER PUBLICATIONS

International Search Report; International Application No. PCT/EP2022/085299; Date of Mailing Jan. 31, 2023, 4 pages.
(Continued)

*Primary Examiner* — Ali Z Fadhel
(74) *Attorney, Agent, or Firm* — CANTOR COLBURN LLP

(57) ABSTRACT

A process for the conversion of plastics to chemicals includes, in part: providing a plastics stream (A) including polyvinyl chloride (PVC); supplying the plastics stream (A) and a solvent (S) to a reactor vessel (1); subjecting the plastics in the reactor vessel to a temperature of ≥250° C. to <350 under applying a vacuum or using an inert gas sweep, and evacuating the generated hydrogen chloride (B) from the vessel, wherein the PVC is partially dechlorinated to form a plastics stream (C) including partially unsaturated PVC; removing the plastics stream (C) including partially unsaturated PVC from the reaction vessel; separating in a separation system (2) at least a part of the partially unsaturated PVC from the plastics stream to form a dechlorinated plastics stream (D) including the solvent; and combining the (Continued)

stream (D) with an atmospheric residue stream (N) to obtain a stream (O).

15 Claims, 2 Drawing Sheets

(56) References Cited

FOREIGN PATENT DOCUMENTS

| | | | |
|---|---|---|---|
| WO | 2021091724 | A1 | 5/2021 |
| WO | 2021204818 | A1 | 10/2021 |
| WO | 2023117516 | A1 | 12/2022 |

OTHER PUBLICATIONS

Written Opinion, International Application No. PCT/EP2022/085299; International Filing Date Dec. 12, 2022, Date of Mailing Jan. 31, 2023, 4 pages.
International Search Report of the ISA/EPO mailed Feb. 1, 2023 for International Application No. PCT/EP2022/085301 filed Dec. 12, 2022, 4 pages.
Written Opinion of the ISA/EPO mailed Feb. 1, 2023 for International Application No. PCT/EP2022/085301 filed Dec. 12, 2022, 4 pages.

* cited by examiner

PROCESS FOR CONVERSION OF WASTE PLASTICS INTO CHEMICALS

CROSS REFERENCE TO RELATED APPLICATIONS

This application is a National Stage application of PCT/EP2022/085299 filed Dec. 12, 2022, which claims the benefit of European Application No. 21216456.0, filed Dec. 21, 2021, both of which are incorporated by reference in their entirety herein.

BACKGROUND

The present invention relates to a process for conversion of waste plastics into chemicals. In particular, the invention relates to a process involving dechlorination of the plastics, and conversion of thereof into chemicals via a coking process.

To the background of the present global developments to reduce energy and material footprint in amongst others the manufacturing of materials such as polymers and chemicals, there is a clear driver to seek reduction of energy and raw materials that are used in manufacturing of such materials. Particularly, there is a driver to enhance circularity of use of materials, after having arrived at end-of-life for a certain application, thereby reducing the use of virgin raw materials in the manufacturing of polymers and chemicals, which typically are fossil-feed based raw materials, obtained from crude oil or natural gas feedstocks. By increasing the circularity, the use of virgin raw materials is reduced, and thereby the materials footprint associated with the manufacturing of polymers and chemicals.

A promising way of increasing the circularity is by re-using end-of-life plastics, collected and made available as waste plastics streams. Such waste plastics streams can be obtained from consumer waste collection, from industrial waste collection, or by collection of waste as littered in the environment, either as aquatic littering or as land-based littering. Typically, such waste plastics streams are mixtures of various types and qualities of plastics. Through sorting, certain streams may be obtained that qualify for re-use as thermoplastics, either by directly subjecting them to thermal shaping processes or via blending them with high-quality virgin-type plastic materials to compensate for loss of properties. Such way of re-use of material however is only appropriate for a limited fraction of waste plastics that can be sorted out of the mixed waste streams as provided from waste collection so that the obtained stream has high uniformity of material composition.

Still, typically a significant portion of the waste plastics as provided by collection, if not a major portion, is not suitable for such direct re-use as polymer. Such mixed plastic waste commonly is discarded of by processes like waste incineration. In order to increase material circularity, there is a desire to develop alternative processing methods for such mixed waste plastic streams. One route for doing so is by means of chemical recycling, wherein the polymer materials that constitute the waste plastics streams are depolymerised to provide hydrocarbon materials that, directly or indirectly, can by once again be converted into polymers through polymerisation processes.

Such chemical conversion processes provide certain benefits, amongst others in that they may be operated using waste plastic compositions of varying nature, including waste plastic compositions that show particularly large variation in batch-to-batch composition.

It is particularly desirable for one to be able to utilise existing chemical conversion process technologies for the purpose of converting waste plastic streams into valuable hydrocarbon materials. Therefore, where a technology would be made available via which existing petrochemical assets would be rendered suitable for use in conversion of waste plastics streams into hydrocarbons, such would be broadly desirable.

SUMMARY

One such opportunity now is presented by certain refinery assets. In view of reduced hydrocarbon consumption for energy and transport, which is a current and expectedly further developing trend, a certain fraction of the ubiquitously present refinery assets may well become underutilised or even idled, and therefore available for alternative uses. One such use may well be the conversion of waste plastics into hydrocarbons that can serve as feedstocks for making chemical and/or polymer products, thereby creating a circular economy of plastics materials and reducing the material footprint.

Certain ubiquitously available sources of waste plastics include post-consumer waste streams and post-industrial waste streams. Such streams comprise collected plastics discarded by common household use or industrial use. As in typical household use, the plastics that end up forming a waste are of very different origin and nature, and thereby of varying constitution, the stream of waste plastics collected from household use is typically a mixed waste plastic stream. It typically contains plastics of different types of chemical constitution, amongst which exemplary species include polyolefins such as polyethylenes and polypropylenes, polystyrenes, polyvinyl chlorides, and polyesters, to name only some. Furthermore, one may expect quite some batch-to-batch variation in composition of batches of collected post-consumer or post-industrial mixed plastics waste.

The mixed nature of such waste plastics streams, and the variations in batch-to-batch composition, pose certain challenges in terms of processability of the post-consumer mixed waste plastics. Many of the technologies that are available or being developed that target processing of mixed waste plastics into materials that can be re-used for purposes typical to plastic materials do provide certain product quality requirements for a batch of waste plastics to comply with in order to suitably serve as raw materials for conversion via such technologies.

One of the quality requirements is that the quantity of certain impurities must be below a certain level. A particular impurity whose presence in waste plastics is typically required to be low is chlorine atoms. During various processing steps of waste plastics, which may constitute either mechanical conversion steps or chemical conversion steps, chlorine atoms tend to detrimentally affect the processes and the equipment in which those processes are operated. A well-known issue associated with the presence of chlorine is corrosion of metals which are present in the operating equipment. Furthermore, when subjected to catalysed chemical conversion processes, the presence of chlorine may interfere with the catalytic activity of the used catalysts. Accordingly, most refinery and chemical operations have a limit to the amount of chlorine that can be contained in their feeds, a.o. because one of the byproducts from downstream processing is hydrogen chloride (HCl), which is very corrosive and can cause severe damage to a.o. metal parts, especially when water vapour is present.

In waste plastics streams, the chlorine atoms that may be present in it particularly originate from the presence of polyvinyl chloride plastics (PVC) in the waste plastic stream. PVC is a polymer product having many attractive properties, and is used ubiquitously and for a wide variety of applications. Accordingly, a waste plastics stream may comprise a certain quantity of chlorine atoms originating from PVC.

A particular route for processing waste plastics is by converting these plastics into chemical product streams that can again be used as building blocks to produce new chemical and/or polymer products of exactly the same quality as the products they originated from, which may be done by processing the waste plastics via certain refinery assets. For the waste plastic materials to be suitable for use in conversion reactions via such refinery assets, it is required that they comply with a certain composition specification. One aspect of such specification is the quantity of chlorine atoms that is present in the composition. Many refinery assets have strict limitations regarding the specifications of the feed streams that can be processed, in order to safeguard the process continuity and efficiency, and the longevity of the facilities. The presence of chlorine atoms acts to the detriment of these requirements. As it is a driver at the present day to arrive at ways to enable utilisation of waste plastics-based feedstocks in existing facilities, the ability to meet the feedstock specifications of these facilities is paramount.

It will therefore be understood that there is a desire for having available a process whereby the quantity of chlorine in waste plastics feeds is reduced. Such process would render waste plastics feeds more convenient to process in refinery and chemical facilities. This is now provided by the present invention by a process for the conversion of plastics to chemicals comprising in this order the steps of:

(i) providing a plastics stream (A) comprising polyvinyl chloride (PVC);
(ii) supplying the plastics stream (A) and a solvent (S) to a reactor vessel (1);
(iii) subjecting the plastics in the reactor vessel to a temperature of ≥250° C. to <350, preferably of ≥275° C. and ≤325° C., preferably for a period of 5-30 minutes, under applying a vacuum, preferably of ≤200 mbar, or using an inert gas sweep, and evacuating the generated hydrogen chloride (B) from the vessel, wherein the PVC is partially dechlorinated to form a plastics stream (C) comprising partially unsaturated PVC;
(iv) removing the plastics stream (C) comprising partially unsaturated PVC from the reaction vessel;
(v) separating in a separation system (2) at least a part of the partially unsaturated PVC from the plastics stream to form a dechlorinated plastics stream (D) comprising the solvent;
(vi) combining the stream (D) with an atmospheric residue stream (N) to obtain a stream (O);
(vii) supplying the stream (O) to a vacuum distillation unit (3) to produce a vacuum gas oil stream (Q) and a vacuum residue stream (P) that meets the chlorine specifications for a coker unit (4); and
(viii) providing the stream (P) to the coker unit, and subjecting the coker unit (4) to such conditions to obtain a liquid coker stream (I) and a solid coke product (L).

Such process allows for the conversion of plastic compositions comprising PVC into chemical products that are suitable for renewed use as raw materials in for example the production of high-quality polymer materials, thereby contributing to improvement of circular use of plastic materials.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
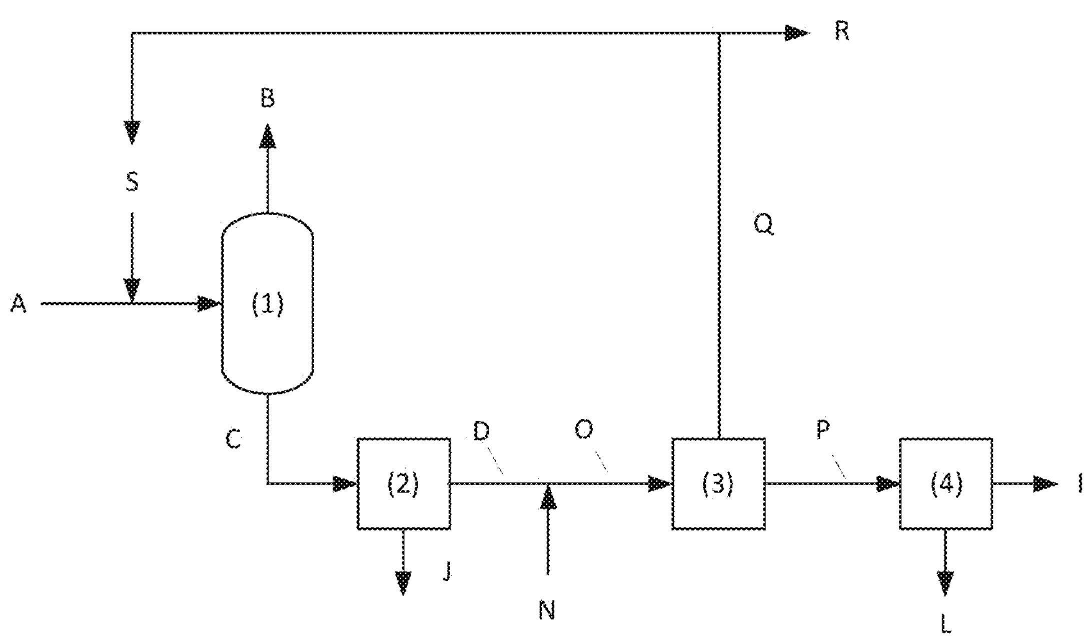
FIG. 1 presents a representation of an embodiment of the process.

The plastics stream (A) may for example comprise ≤10.0 wt %, preferably ≥0.001 and ≤10.0 wt % of PVC, more preferably ≥0.5 and ≤10.0 wt %, even more preferably ≥0.5 and ≤5.0 wt %, with regard to the total weight of the plastics stream.

In the reactor vessel in step (iii), the plastics may for example be present in a molten state, as a slurry, or as a solution.

The step (ii) may for example involve passing the plastics stream (A) via a melt extruder, preferably a single-screw melt extruder, operating at a temperature of ≤250° C., preferably of ≥180° C. and ≤225° C., to obtain a molten plastics stream, and supplying the molten plastics stream to a mixer wherein the stream is mixed with solvent (S), and subsequently fed to the reactor vessel. The molten plastics stream exiting the melt extruder may, prior to being supplied to the reactor vessel, be further heated to a temperature of for example ≥250° C. and ≤300° C. The heating preferably is performed using a hot oil system.

Alternatively, the step (ii) may involve passing a mixture comprising a quantity of the plastics stream (A) and vacuum gas oil via a high shear mixer at a temperature of 200-220° C. to obtain a suspension, and supplying this suspension to the reactor vessel. The mixture may for example comprise ≥10.0 and ≤90.0 wt % of the plastics stream (A), preferably ≥10.0 and ≤50.0 wt %, more preferably ≥10.0 and ≤30.0 wt %.

The separation step (v) is performed by passing the plastics stream (C) comprising partially unsaturated PVC that is removed from the reaction vessel over a filter system in a state that the partially unsaturated PVC is present in the waste plastics stream in solid form, so that a dechlorinated plastics stream (D) and a solid partially unsaturated PVC stream (J) is obtained. Preferably, the filter system has an average pore size of ≤25 μm. Also preferably, the step (v) is performed at a temperature of ≥200° C. In step (v), the separation results in that at least a part of the partially unsaturated PVC is removed from the plastics stream (C). For example, in step (v), at least 50.0 wt % of the partially unsaturated PVC that is present in stream (C) is removed, preferably at least 70.0 wt %, more preferably at least 90.0 wt %. Even more preferably, the partially unsaturated PVC that is present in stream (C) is removed in step (v).

The evacuated HCl stream (B) may in certain embodiments be subjected to a caustic treatment to complex HCl with NaOH to obtain NaCl. The evacuated HCl-containing stream (B) may in certain embodiment, immediately upon exiting the reactor vessel, be passed through a condenser to remove solvent, which subsequently is returned into the reactor.

It is preferred that the stream (O) comprises ≥0.1 and ≤10.0 wt %, preferably ≥1.0 and ≤5.0 wt %, more preferably ≥1.0 and ≤2.0 wt %, of plastics, with regard to the total weight of stream (O).

In a certain embodiment, the stream that is subjected to step (v) may comprise ≥10.0 and ≤99.9 wt %, preferably ≥20.0 and ≤99.0 wt %, more preferably ≥50.0 and ≤99.0 wt %, of vacuum gas oil, with regard to the total weight of the stream.

The process according to the present invention preferably is a continuously operating process. It is preferred that the reactor vessel is equipped with an inert gas purge.

The coker unit (4) may for example comprise a furnace (5) and one or more coke drum(s) (6) configured so that the stream (P) is supplied to the furnace, the product stream from the furnace (M) is supplied to a coke drum, and a liquid coker stream (I) and a solid coke product (L) are obtained from the coke drum. The stream (P) may for example be supplied at a temperature of ≥300 and ≤450° C. The stream (P) may for example be heated in the furnace by passing the feed through heating tubes and subjecting it to external heat energy to obtain a furnace product stream (M) having a temperature of ≥450° C. and ≤550° C., preferably of ≥475° C. and ≤500° C.

The vacuum gas oil may for example have an initial boiling point of ≥250° C. and a final boiling point of ≤600° C.

The atmospheric residue stream (N) may for example have an initial boiling point of ≥350° C.

The vacuum residue stream (P) may for example have an initial boiling point of ≥550° C.

The furnace (5) that may be used in the process according to the present invention may for example be a furnace in which multiple feed tubes are passed through a heating chamber, also referred to as a firebox, so that the feed is heated by external heating. The tubes may be passed through the firebox multiple times, for example two or four times. The heat may for example be provided by burners placed below the tubes. The burners may be controlled in such way to provide the required heating of the feed in the tubes to obtain the desired temperature of the feed exiting the furnace. In order to ensure that the coke formation of the feed does not occur in the furnace tubes, but is delayed until the feed materials reach the coke drum, the mass velocity of the feed through the furnace is preferably greater than 1800 $kg/s/m^2$. A quantity of steam may be added to the feed tubes, such as for example between 0.1 and 2.0 wt % of steam with regard to the total weight of the feed. Such addition of steam contributes to increase of velocity in the tubes. The combined coker feed stream (H) may be heated in the furnace by passing the feed through heating tubes and subjecting it to external heat energy to obtain a furnace product stream (M) having a temperature of ≥450° C. and ≤550° C., preferably of ≥475° C. and ≤500° C.

The feed may exit the furnace at a temperature of preferably ≥450° C. and ≤550° C., more preferably of ≥475° C. and ≤500° C. Upon exiting the furnace, the heated furnace product stream (M) may be transported via a transfer line into a coke drum. It is desirable that the residence time in the transfer line is kept as short as possible, to avoid occurrence of coking prior to reaching the coke drum. Accordingly, it is desirable to keep the transfer line as short as possible. Furthermore, as typically a furnace is connected to multiple coke drums to ensure continuous operations, a switch valve may be present in the transfer line, to allow directing the feed to a desired coke drum.

A typical coke drum that may be used in the process according to the present invention may have a diameter of between 4 and 9 m., and a length of between 20 and 30 m. The drum typically is positioned vertically. The drum may be operated at a pressure of between 100 and 600 kPa, such as between 200 and 300 kPa.

A typical configuration may involve two or more, often two, coke drums, so that one drum may be in operation whilst the other drum(s) may be subjected to coke removal and cleaning before switching back in operation again. As coke is formed in the drum, the drum needs to be evacuated from time to time in a batch operation.

In the coke drum, a cracking process occurs which results in a top product that is continuously removed from the drum as liquid coker stream (I), and a bottoms product, being the coke, that is removed as solid coke product (L), typically at the end of the run. The stream (I) may be removed from the drum at a temperature of below 500° C., such as between 475° C. and 500° C., to avoid coke formation in the transport line.

The process preferably is a continuously operating process. The reactor vessel may be equipped with an inert gas purge.

Figure 2:
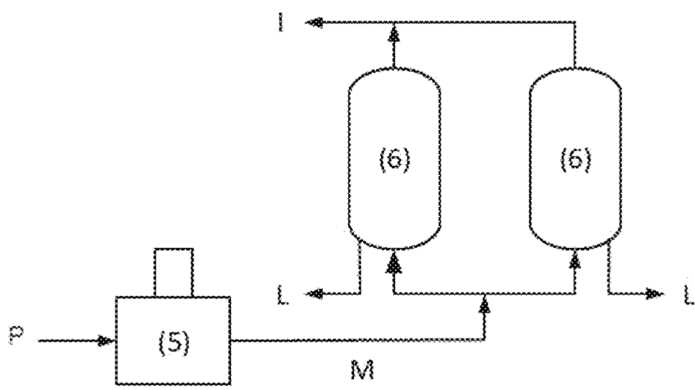
FIG. 2 presents a representation of an embodiment of the coker unit (4).

FIG. 1 presents a representation of an embodiment of the process according to the invention. FIG. 2 presents a representation of a particular embodiment of the coker unit (4). In each of the figures, where applicable, the numbers and letters represent:

(1) Reactor Vessel
(2) Separation System
(3) Vacuum Distillation Unit
(4) Coker Unit
(5) Furnace
(6) Coke drum(s)
A: Plastics stream
B: Hydrogen chloride
C: Plastics stream comprising partially unsaturated PVC
D: Dechlorinated plastics stream containing solvent
I: Liquid coker product
J: Partially unsaturated PVC
L: Solid coke product
M: Coker furnace product
N: Atmospheric Residue
O: Vacuum distillation feed
P: Vacuum residue
Q: Vacuum gas oil
R: Vacuum gas oil The invention will now be illustrated by the following non-limiting example.

A mixture of 4.04 g high-density polyethylene (HDPE) having a weight-average molecular weight of 72,000 g/mol and 0.20 g polyvinyl chloride (PVC) having a weight-average molecular weight of 85,000 g/mol were added to a quartz boat of approximately 90 mm long by 20 mm wide and 15 mm deep. The chlorine content of this mixture was 29,000 ppm by weight. The boat containing the polymer mixture was placed in a 1.5" (3.8 cm) tube furnace, and flushed with nitrogen to ensure that all oxygen was removed. After that, a flow of 150 $cm^3$/min of nitrogen was established through the furnace. The furnace temperature was raised to 300° C. at rate of 5° C./min and held at 300° C. for 60 minutes prior to cooling down to room temperature.

It was observed that the HDPE had melted and flowed to fill up the bottom of the boat, whereas the PVC had puffed up and turned black while essentially remaining in place. The ingot of solidified polymers that was formed upon cooling was removed from the quartz boat. The segment of the ingot containing the black PVC was broken off and supported on a piece of 16-mesh stainless steel screen which was placed atop the quartz boat. This was again placed in the tube furnace and the temperature was raised to 150° C., allowing the HDPE to melt and flow through the screen into the boat. After 60 minutes at 150° C., the furnace was cooled and the boat removed. It was observed that the HDPE had melted and fallen through the screen and collected in the bottom of the boat, whereas the black PVC was retained by the screen. The chlorine content of the collected HDPE was measured by XRF and found to be 30 ppm by weight, representing a reduction of 99.9% from the starting mixture.

The obtained dechlorinated product was mixed with a vacuum gas oil at a ratio of 50:1 parts by weight to obtain a composition comprising 2 wt % of the dechlorinated product. This product comprised <1 ppm of chlorine, thereby forming a product suitable for processing in a coker unit.

From the above it can be observed that a process according to the present invention allows for a significant reduction of chlorine content in a mixed plastics stream. This is particularly desirable in processing of waste plastics streams, such as post-consumer mixed plastic waste streams. Such streams typically contain a fraction of chlorine-containing polymers, such as PVC, which is undesirable as presence of chlorine in plastics processing equipment can give rise to undesirable effects such as e.g. corrosion. By the process of the present invention, a solution to avoid this is provided.

The invention claimed is:

1. A process for the conversion of plastics to chemicals comprising in this order the steps of:

(i) providing a plastics stream (A) comprising polyvinyl chloride (PVC);

(ii) supplying the plastics stream (A) and a solvent (S) to a reactor vessel (1);

(iii) subjecting the plastics in the reactor vessel to a temperature of ≥250° C. to <350° C. under applying a vacuum or using an inert gas sweep, and evacuating a generated hydrogen chloride (B) from the vessel, wherein the PVC is partially dechlorinated to form a plastics stream (C) comprising partially unsaturated PVC;

(iv) removing the plastics stream (C) comprising partially unsaturated PVC from the reaction vessel;

(v) separating in a separation system (2) at least a part of the partially unsaturated PVC from the plastics stream to form a dechlorinated plastics stream (D) comprising the solvent;

(vi) combining the stream (D) with an atmospheric residue stream (N) to obtain a stream (O);

(vii) supplying the stream (O) to a vacuum distillation unit (3) to produce a vacuum gas oil stream (Q) and a vacuum residue stream (P) that meets a chlorine specifications for a coker unit (4); and (viii) providing the stream (P) to the coker unit, and subjecting the coker unit (4) to such conditions to obtain a liquid coker stream (I) and a solid coke product (L).

2. The process according to claim 1, wherein the plastics stream (A) comprises ≤10.0 wt % of PVC, with regard to the total weight of the plastics stream.

3. The process according to claim 1, wherein the step (ii) involves passing the plastics stream (A) via a melt extruder, operating at a temperature of ≤250° C., to obtain a molten plastics stream, and supplying the molten plastics stream to the reactor vessel.

4. The process according to claim 3, wherein the molten plastics stream containing solvent (S) from (ii) is, prior to being supplied to the reactor vessel, further heated to a temperature of ≥250° C. and ≤300° C.

5. The process according to claim 1, wherein the solvent (S) is a vacuum gas oil.

6. The process according to claim 1, wherein the separation step (v) is performed by passing the plastics stream (C) comprising partially unsaturated PVC that is removed from the reaction vessel over a filter system in a state that the partially unsaturated PVC is present in the plastics stream in solid form, so that the dechlorinated plastics stream (D) and a solid partially unsaturated PVC stream (J) is obtained.

7. The process according to claim 1, wherein the evacuated HCl stream (B) is subjected to a caustic treatment to complex HCl with NaOH to obtain NaCl.

8. The process according to claim 1, wherein the evacuated HCl-containing stream (B) is, immediately upon exiting the reactor vessel, passed through a condenser to remove medium, which subsequently is returned into the reactor.

9. The process according to claim 1, wherein the atmospheric residue stream (N) has an initial boiling point of ≥350° C.

10. The process according to claim 1, wherein the vacuum residue stream (P) has an initial boiling point of ≥550° C.

11. The process according to claim 1, wherein the stream (O) comprises ≥0.1 and ≤10.0 wt %, of plastics, with regard to the total weight of stream (O).

12. The process according to claim 1, wherein the coker unit comprises a furnace (5) and one or more coke drum(s) (6) configured so that a stream (H) is supplied to the furnace, a product stream from the furnace (M) is supplied to the coke drum(s), and the liquid coker stream (I) and the solid coke product (L) are obtained from the coke drum(s).

13. The process according to claim 12, wherein the stream (H) is supplied at a temperature of ≥300° C. and ≤450° C.

14. The process according to claim 1, wherein the solvent (S) is a vacuum gas oil having an initial boiling point of ≥250° C. and a final boiling point of ≤600° C.

15. The process according to claim 12, wherein the coke drum is operated at a pressure of between 100 kPa and 600 kPa.

* * * * *